Jan. 5, 1926.  
M. WILDERMAN  
1,568,787  
APPARATUS FOR PRODUCTION OF HYPOCHLORITES AND CHLORATES  
Filed April 13, 1921  
3 Sheets-Sheet 1

Inventor  
Meyer Wilderman  
By William C Sinton  
Attorney

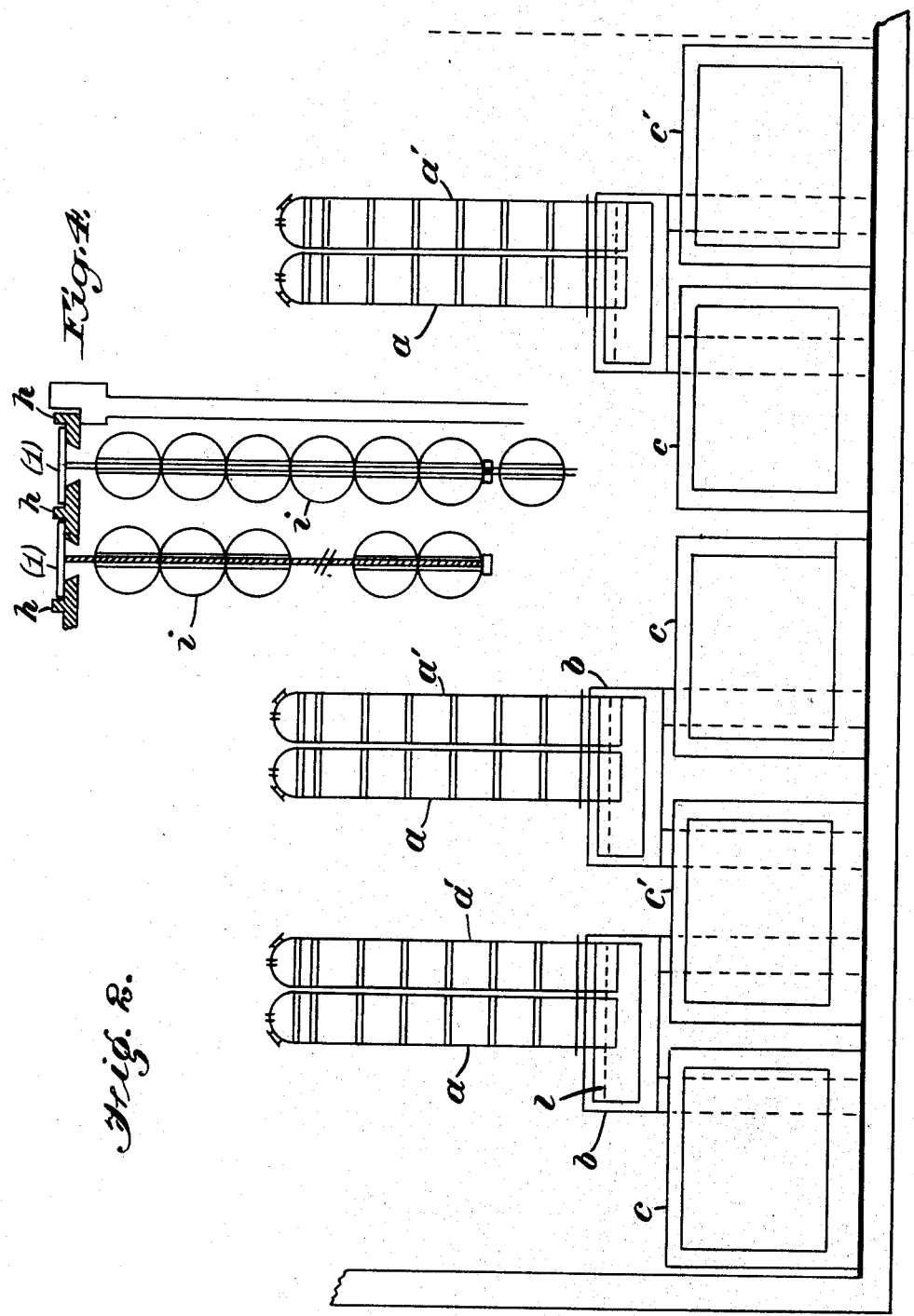

Jan. 5, 1926.
M. WILDERMAN
1,568,787
APPARATUS FOR PRODUCTION OF HYPOCHLORITES AND CHLORATES
Filed April 13, 1921    3 Sheets-Sheet 3
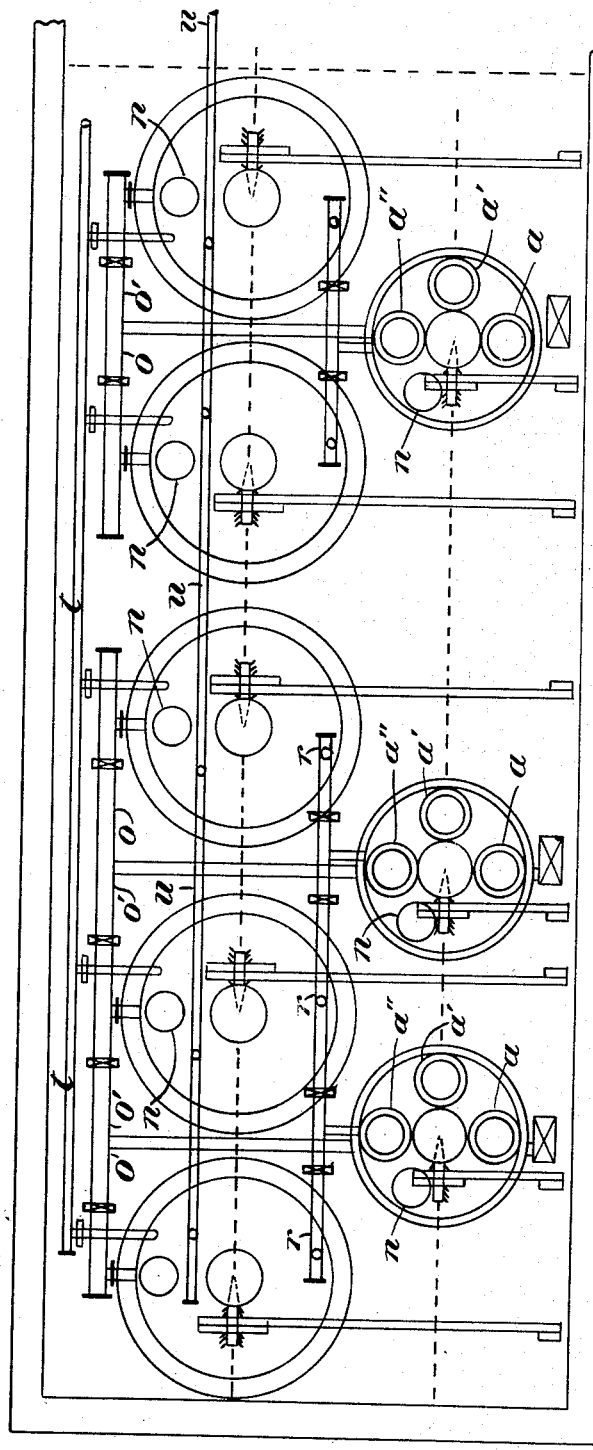
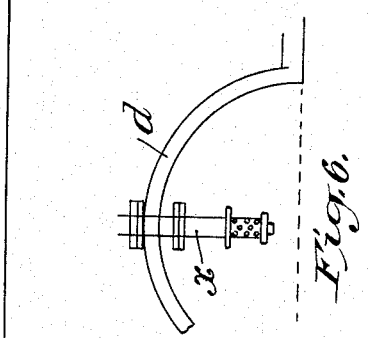
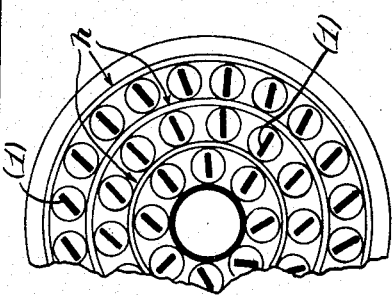
Inventor
Meyer Wilderman
By William C Sinton
Attorney Patented Jan. 5, 1926.

1,568,787

UNITED STATES PATENT OFFICE.

MEYER WILDERMAN, OF LONDON, ENGLAND.

APPARATUS FOR PRODUCTION OF HYPOCHLORITES AND CHLORATES.

Application filed April 13, 1921. Serial No. 461,167.

*To all whom it may concern:*

Be it known that I, MEYER WILDERMAN, a citizen of Rumania, residing at 72 Fellows Road, Hampstead, London, N. W. 3, England, have invented new and useful Improvements in Apparatus for Production of Hypochlorites and Chlorates, for which I filed application in England, March 16, 1920, of which the following is a specification.

The present invention relates to the production of calcium or magnesium hypochlorite or chlorate and of alkali metal chlorates by clorination of calcium or magnesium hydroxide in subsequent transformation into alkali metal cholrate.

The speed of formation of calcium hypochlorite from calcium hydroxide and chlorine follows the laws of chemical velocity of reaction in heterogeneous systems (see the publications of M. Wilderman in the Zeitschrift für Physikalische Chemie in the years 1899–1909, also Phil. Mag. for the same period) which in its simplified form, when the concentration of the chlorine gas is kept constant, is:

$$V = K'.S.\text{Conc.}(OH)^2$$

i. e. the speed of formation of hypochlorite is directly proportional to the surface of the solution in contact with the chlorine gas, $S$, and to the square of the hydroxyl ions $\overline{OH}$ of the calcium hydroxide in solution.

As the chlorination of the milk of lime is going on, more and more hypochlorite and chloride of calcium are formed in solution, the last being easily soluble in water and highly dissociated. This leads to an enormous accumulation of the calcium ions in solution. This has the effect that the solubility of the solid calcium hydroxide in water enormously and continuously diminishes, and with it diminishes the concentration of the hydroxyl ions in the solution, as the reaction goes on and calcium hypochlorite and chloride are formed in solution. The higher the concentration of the last in solution becomes, the slower the reaction of chlorination therefore becomes, especially as the speed of chlorination diminishes as the square of the hydroxyl ions.

The only way to increase the speed of formation of hypochlorite and chlorate is therefore given to us in the increase of the surface of contact between the chlorine gas and the solution.

For a technical process to be practicable, it must produce in given arrangements in a given time a certain amount of product.

For this reason in the different arrangements proposed for chlorination of milk of lime, by circulating the same, there is a limit to the concentrations which can be prepared in the same in a practical manner, though from a chemical standpoint all concentrations can be prepared, if the time necessary for it be disregarded.

Several arrangements were devised and are used in the pulp industry for making hypochlorites in solution to be used for bleaching purposes. The solutions prepared are about 7–10°Tw. and is brought about by bringing chlorine gas into contact with circulated milk of lime. But none of the arrangements proposed proved, for reasons given above, to be practicable for the manufacture of calcium or magnesium hypochlorites or chlorates of high concentration, and none of them are used in any leading factory manufacturing alkali metal chlorates, because high concentrations are necessary for the last so as to diminish as far as possible the costs of evaporation.

In the known processes for producing chlorates the circulation of milk of lime is avoided altogether, so as to be able to use higher concentrations of the milk of lime than it is practicable in the apparatus hitherto proposed, in which the use of higher concentrations of the milk of lime inevitably lead to the separation of solid hydroxide in different parts of the apparatus through which the said solution is circulated, the solutions of milk of lime or of magnesium containing only very little of the hydroxide in solution and almost the whole of the hydroxide in suspension, as long as the solution is stirred. The keeping up of the solid in suspension by mechanical means becomes all the more difficult the higher the concentration of the milk of lime or of magnesia is. In the different chlorate factories milk of lime between 8° and 16° Tw. is used and the chlorination until its completion usually last 2–3 days (see Lunge).

In these processes the milk of lime is agitated in superficial contact with the chlorine gas in a series of absorbers (octagons at United Alkali Company), through which the gas is passed in succession. The surfaces of the liquid in the battery of absorbers in contact with the chlorine gas is in the arrangements of Pechiney at Salindres about 17 m. sq. for a production of about 10 tons of chlorate per week, of Lunge about 23 m. sq. for 2.8 tons per week, at the United Alkali Company about 35 m. sq. for about 20 tons per week. These surfaces are essentially greater than those used in the apparatus, using circulation of the solution hitherto employed for the manufacture of hypochlorites of 7–10° Tw. for the pulp industry. The concentrations of the resulting solutions of chlorate and chloride vary according to different authorities: 25–27° Tw. are recommended by Lunge; 29–30° Tw. are used at Widnes, where 26–31° Tw. are considered as the outside limits; 40–44° Tw. are used in some continental works (Pechiney, etc.: see Lunge 1911) which are considered as the highest attainable limits.

The solutions which on completion of chlorination consist of calcium or magnesium chlorate and chloride and a small amount of hypochlorite are then allowed to settle in separate vessels, are afterwards decanted, filter pressed and passed into storage tanks, from thence they are sent into pans or caustic pots for evaporation and transformation into alkali metal chlorates. For the last a very considerable and expensive plant is required, the maintenance costs of which are very high.

Two methods of concentration and transformation are used, the first one consisting in concentrating direct to 70° Tw. hot, the liquor thereby attaining a temperature of about 133° C. and transforming the calcium chlorate in the hot solution into alkali metal chlorate, for instance, by the addition of potassium chloride (e. g. at St. Helens).

Since calcium chlorate already begins to decompose at about 70° C. a considerable amount (up to 15%) of the chlorate is decomposed during such evaporation in consequence of the aforesaid high temperature and this decomposition is accelerated by the iron of the pans. The second method of concentration and transformation consists in first concentrating to 50–55° Tw. and then transforming the calcium chlorate into potassium chlorate, which is allowed to crystallize out on cooling, the mother liquor being thereafter concentrated to about 70° Tw. Here also the decomposition of the chlorate in considerable.

In practice for concentration of the liquors and transformation into potassium chlorate, 3.5–5 tons of fuel are required per ton of potassium chlorate.

In these known processes the yield, after refrigeration is used and a part of the potassium chlorate in the mother liquors is separated by refrigeration never exceeds about 74%.

Moreover, owing to the decomposition of calcium chlorate an additional 33% of lime and chlorine and 12% of potassium chloride are required per ton of potassium chlorate, the result being still more unsatisfactory in the case of sodium chlorate.

The present invention aims at overcoming the aforesaid drawbacks of the existing processes.

The object of the invention is the direct production of highly concentrated solutions of hypochlorite and chlorates without necessitating evaporation, and at the same time to produce the most suitable solutions for recovering pure potassium chlorate, in case this is produced.

Another object of this invention is to prepare hypochlorite of high concentration by means of circulation of milk of lime and chlorination under conditions, which will be presently described, so that liquid bleach may eventually replace the process of making solid bleach, even if the same has to be transported. By this the costly packing of the solid bleach may thus be dispensed with, and the costs of production considerably reduced, the requisite plant being considerably cheaper, requiring considerably less labour, besides giving a higher efficiency for the chlorine gas, than it is possible to get in the manufacture of solid bleach.

By this the costs of the manufacture of chlorates will be considerably reduced, by dispensing with the usual concentration plant, which is expensive and liable to rapid deterioration and by saving the 3.5–5 tons of coal per ton of chlorate.

By keeping the process of chlorination and the subsequent transformation of calcium or magnesium chlorate into alkali metal chlorate at temperatures below those at which the chlorates appreciably decompose, preferably below 60–70° C., an efficiency of about 90–92% of potassium chlorate can be obtained, which is about 18% higher than that obtained in other Liebig processes.

The chlorination apparatus will be of the simplest and cheapest construction and have a considerably longer life than the usual type of apparatus used in the manufacture of chlorates for the chlorination of calcium or magnesium hydroxide.

Through the higher efficiency, a great economy in chlorine burned lime and in potassium chloride is effected.

Inasmuch as the velocity of absorption of chlorine by calcium or magnesium hydroxide is directly proportional to the surface of the liquid coming into contact with the gas (for a given strength of the chlorine gas) according to the invention, the calcium or magnesium hydroxide or mixtures of said hydroxide with hypochlorite, or hypochlorite, chlorate and chloride already formed, are exposed to the action of chlorine in such a way as to present a very great surface of contact with the gas or are brought into contact with the chlorine in a finely subdivided condition. The surface of contact is taken as large as it is requisite for getting the desired higher concentrations within a technically rational time.

It must, however, be mentioned that it is self-understood that the apparatus which can successfully be used for the manufacture of higher concentrations of hypochlorites, may also be successfully used for the manufacture of hypochlorites of smaller concentrations. The apparatus will only be correspondingly smaller and work better also for the pulp industry than the apparatus hitherto employed, as far as the work of the system will not be obstructed by separation of solids either within the absorption towers or any other part of the apparatus through which the milk of lime is circulated.

In order to facilitate the getting of high concentrations, calcium or magnesium oxide or preferably hydroxide (e. g. slacked, cooled and sieved lime) is gradually added during chlorination, so as to avoid the use of concentrated solutions of milk of lime or of magnesia, which easily separate calcium or magnesium hydroxide in the apparatus. For this the apparatus, through which the milk of lime or of magnesia is circulated, must be so devised, that no solid hydroxide should separate in any part of the absorption tower, and stirring means must be provided in the other parts of the apparatus so as to prevent the separation of solid hydroxide in any part of the same, which would interfere with the work of the process. In order to prevent appreciable decomposition of the chlorates formed, the temperature is maintained at preferably not above about 60–70° C., not only during the chlorination, but also during the subsequent transformation of the calcium or magnesium chlorate into alkali metal chlorate.

With the object of saving plant and space, instead of using separate settling tanks for removing the undissolved calcium or magnesium compounds, the undissolved suspended solids from the solution containing calcium or magnesium chlorate and chloride are directly filterpressed, the solution being kept in constant agitation, in order to prevent deposition of solids.

In order to clearly understand the invention, reference is made to the accompanying diagrammatic drawings which show, by way of example, an apparatus suitable for carrying out the invention.

Figure 2 is a vertical section of an absorption plant with an output of 1500 tons per year;

Figure 3 is a horizontal section thereof;

Figure 4 is a detail section of the distributor and spreading elements suspended therefrom;

Figure 5 is a plan view corresponding to Figure 4; and

Figure 6 is a detail of one of the injection sprayers.

Figure 1:
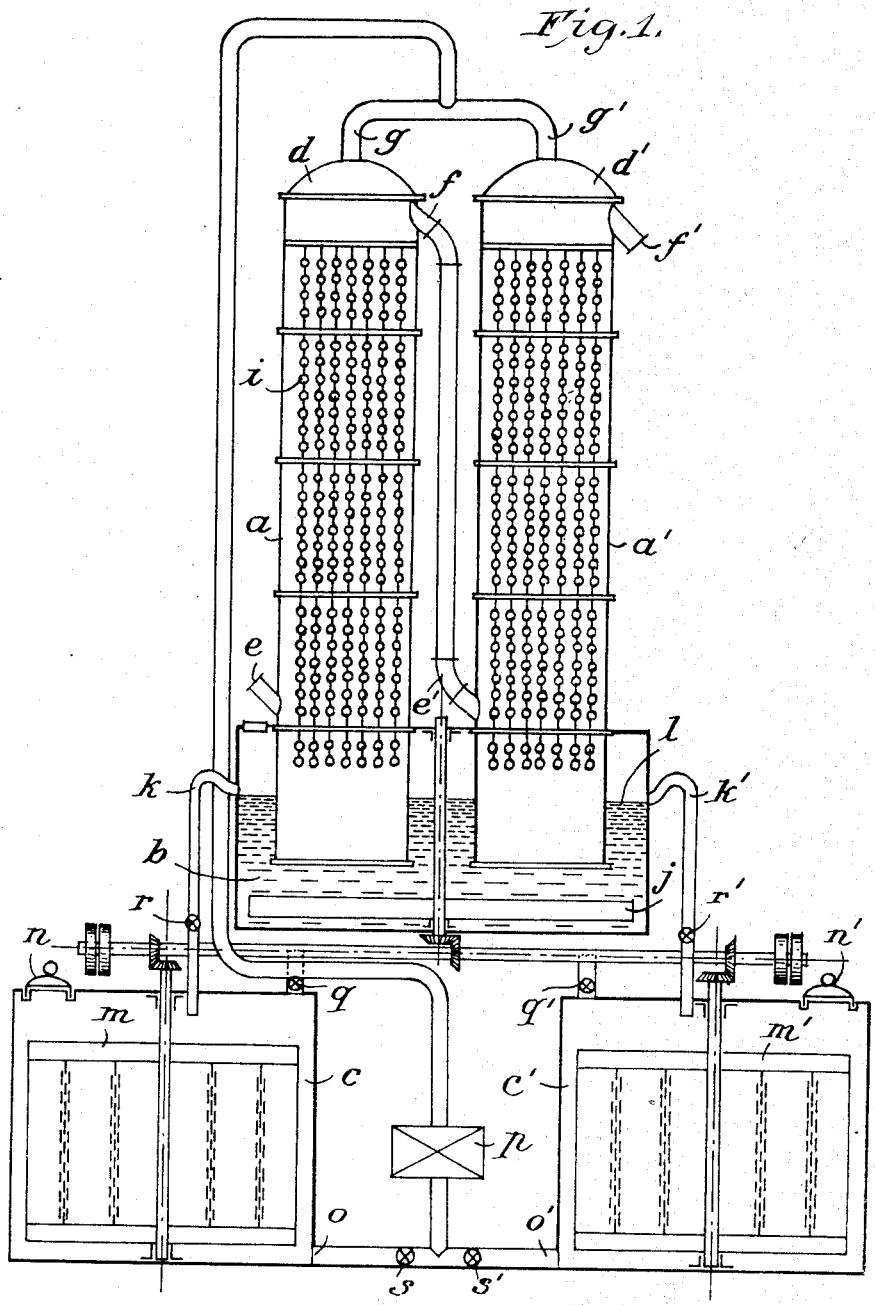
Figure 1 is a vertical section of a double unit of an absorption plant.

In said drawings Figures 1 and 2 $a$ and $a'$ are absorption towers, $b$ is an intermediate vessel and $c$, and $c'$ are mixers.

The towers are constructed gas tight, either of superposed earthenware tubes or of bricks, ferroconcrete or other suitable chlorine resisting materials. They are open at the bottom and are closed at the top by hoods $d$ and $d'$ provided with inlet means $g$ and $g'$ for the liquor and with hermetically closed windows allowing access to their interior (not shown). Gas inlet means $e$ and $e'$ are provided at the bottom and gas outlet means $f$ and $f'$ at the top. Preferably two or more such towers are connected together in series, so that the outlet means $f$ of one tower is connected to the inlet means $e'$ of the next tower of the series.

Within each tower there are arranged suitable means for distributing the circulated liquor over a very large surface or the liquor is allowed to flow down in a finely subdivided condition, so as to create a very large surface of contact of the liquid with the gas as is necessary to make a rational chlorination of solutions of high concentration possible.

These means may consist of a distributing plate $h$ (Figure 4) arranged near the inlet means for the liquor, and provided with holes for distributing said liquor. An agitator (not shown) may be arranged above said distributing plate to prevent the separation of solid hydroxide. Suitable means for increasing the surface of the circulating liquor are provided within each tower.

In the preferred form of apparatus these distributing means consist of glazed earthenware or glass balls strung on rods, wire, ropes, chains or the like, coated with chlorine resisting ebonite prepared according to the patent of the applicant No. 1,022,014. These are shown by $i$. See Figure 4.

Instead of balls other bodies such as cylinders and the like or any other suitable distributing means may be used provided the conditions are such that no solid calcium or magnesium hydroxide can separate on the same and cause difficulties in working the plant.

In case it is desired to finely subdivide the liquor, suitable injector means $x$ may be provided at the end of the inlet pipes to the hoods $d$ adapted to finely spray and subdivide said liquor (Figure 5). In such case no other distributing means are required in the tower.

The open bottoms of the towers $a$ dip into liquid seals in a closed and gas-tight intermediate vessel $b$ provided with manhole. Said vessel is provided with stirring means $j$ for the purpose of keeping the solid matter contained in the liquor in suspension and or preventing the separation of solid calcium or magnesium hydroxide in the same and the blocking up of the outlets for the solution, which is one of the main difficulties in working with circulation of the liquids.

Said vessel $b$ is also provided with liquid outlet means in the form of siphons $k$ and $k'$, provided with valves $r$ and $r'$ respectively, one siphon $k$ leading into the vessel $c$, and the other $k'$ into the vessel $c'$ and serve for removing any liquor above the level $l$ of the liquid seal, which is near the the highest point in the inside curve of the siphon tube.

The mixing vessels $c$ and $c'$ are preferably made of ferroconcrete and are lined with bricks. They are provided with agitators $m$, preferably in the form of chains stretched on a frame, flat bars of wood or other suitable material, to prevent settling and to keep the liquor of a uniform composition and temperature. Each mixer is provided with inlet means $n$, also serving as manhole, for the calcium or magnesium oxide or hydroxide. The mixers are also provided with means to enable the level of the liquor to be inspected and also with liquor outlet means $o$ and $o'$ provided with valves $s$ and $s'$ leading to the intake of pump $p$ adapted to pump the liquor to the top of the towers to the inlet $g$ and $g'$. A second pump (not shown) is always kept as a reserve and can be operated, if needed, at a moment's notice.

When the invention is applied to the production of potassium chlorate from calcium hydroxide and chlorine the operation is started by opening the valves $r$ and $s$ and the outlet pipe $o$ of the mixer $c$, the valves $r'$, $s'$ and $o'$ being closed.

Milk of lime is prepared in the mixer $c$ which is filled with water, the stirrer $m$ being started and slacked, cooled lime introduced through the inlet $n$. The milk of lime is of the desired strength, is then pumped by pump $p$ to the top of the towers $a$, $a'$ and circulated therethrough, leaving through the vessel $b$ by the siphon $k$ and returning to the mixer $c$, from whence it is pumped back to the towers through the outlet $o$ connected to the intake of the pump $p$. Chlorine of a suitable concentration and from any source, for instance, electrolytic cells, is passed through the inlet $e$ of the first absorption tower $a$ in which it meets a descending stream of milk of lime. The gas leaves at the top outlet $f$ of the tower $a$ and passes downward through the inlet $e'$ of the second tower $a'$ leaving said tower at the outlet $f'$ to enter into the next or following towers or into the return chlorine main. It is therefore characteristic of the above construction that though hypochlorites or chlorates of high concentration are provided, no strong concentration of milk of calcium or magnesium hydroxide is used during the whole chlorination and all necessary technical means are used for preventing the solid calcium or magnesium hydroxide from separating in any part of the apparatus through which the liquor is circulated.

In Figure 1 one unit consisting of two absorption towers is shown. In Figure 2, one unit consists of three absorption towers (Figure 2 shows the whole installation at work, as far as the absorption plant of the chlorate factory comes into consideration.) However, one tower of greater capacity may be used as one unit. Generally two or more of such units are worked together, that is to say, means are provided to connect the chlorine outlet from one unit to the inlet of another unit. When three units are used preferably two are worked together to complete the chlorination and one is worked with fresh milk of lime alone to prepare partially chlorinated solutions, with the object of working the plant more economically (Figure 2).

The chlorine coming into intimate contact with the continuously circulating liquor is progressively absorbed by said liquor with formation of calcium hypochlorite or of hypochlorite and chlorate, according to the temperature at which the chlorination is conducted. When the operation is started with fresh liquor no chlorine will issue from the outlet $f'$ of the second tower, and this continues as long as sufficient calcium hydroxide is in the solution to effectively absorb the chlorine. As the amount of free calcium hydroxide in the circulating liquor diminishes, especially with the formation of the higher concentrations of hypochlorite or of hypochlorite and chlorate in solution, the absorption of chlorine becomes less effective and chlorine begins to leave the outlet $f'$ of the second tower.

The absorption of chlorine becomes more and more difficult, as the concentration of the hypochlorites and chlorates increases.

Before this happens, however, this inlet $f'$ of the first unit is connected to $e$ of a second unit through which freshly prepared milk of lime circulates, so that the unabsorbed chlorine of the first unit is completely absorbed in the second, the outlet of this second unit being connected to the return chlorine main. For this reason two units are connected for completing the chlorination and one unit can work alone with fresh milk of lime for a suitable time. See Figure 2.

During chlorination fresh lime or magnesia is periodically introduced into the mixer $c$ through the inlet $n$ in order to avoid the use of concentrated solutions of milk of lime or magnesia, which easily separate out hydroxides, and the introduction is continued until the desired high concentration of calcium hypochlorite or of calcium hypochlorite and chlorate is obtained; the liquor from the mixer $c$ being constantly circulated through the absorbers, where it comes into intimate contact with the chlorine passing both the first and second unit in serial order, until practically the whole of calcium hypochlorite is transformed in the first unit into calcium chlorate and calcium chloride.

During this process of chlorination the temperature gradually rises and care has to be taken to prevent it exceeding about 60–70° C., this being facilitated by using gas containing only 10–15% of chlorine by volume, the gas being diluted with air and means being employed to rapidly cool the solution, especially at the time when the heat of the reaction is greatest.

In case more diluted gases have to be used, such as waste gases (from bleach chambers of from mechanical apparatus producing solid bleach) containing chlorine, means may be provided for raising the temperature. On the other hand in case the gas contains a considerable amount of chlorine, it may be diluted with air or suitable cooling means may be provided.

As chlorination proceeds, especially when the stage is reached when calcium hypochlorite is rapidly transformed into calcium chlorate, great heat is developed. In order to prevent the temperature of the liquor from rising above about 60–70° C., rapid cooling means must be provided according to the need of the moment, or cold water may be added to the mixer $c$ through the inlet $n$ during said stage. In the latter case the liquor should of course be prepared of a somewhat higher concentration, so as to allow for the dilution. For example, the liquor is first prepared of a strength of about 66° Tw. and is then diluted to about 60–62° Tw. by the addition of water. If the final concentration is to exceed 60–62° Tw. the initial concentration should be correspondingly higher.

When the chlorination to calcium chlorate has been completed in the mixer $c$, the valves $r'$ and $s'$ are reopened and the valves $r$ and $s$ closed. Thus the towers $a$ and $a'$ and the intermediate vessel $b$ are placed in communication with the mixer $c'$, in which in the meantime fresh milk of lime has been prepared, or into which the partially chlorinated milk of lime from C or C' of the second or the third unit has been pumped in the meantime (Figure 2).

This liquor is pumped through the outlet $o'$, valve $s'$ by means of the pump $p$ to the top of the absorbers $a$, $a'$, and is returned from the intermediate vessel $b$ through the siphon $k'$ and the valve $r'$ into said mixer $c'$, the process being repeated as above described.

If the partially chlorinated liquor be pumped from $c$ or $c'$ of the second or of the third unit into $c$ or $c'$ of the first unit and by preparing a fresh solution of milk of lime in the second unit, the working arrangements and the passage of the chlorine gas through the different units remain the same as described above.

To enable the partially chlorinated liquor to be pumped from $c$ of one unit into $c$ of another unit, all the mixers $c$ are connected by one main $t$ (Figure 3) provided with a valve W (Figure 3) leading to each mixer, and with a pump which transfers the liquor through main $u$ from any vessel $c$ into another. This conveyance of the liquor, however, entails a certain loss of time. To avoid the necessity of conveying the liquor, the process is conducted in such a manner that the fresh milk of lime is prepared only in the first unit. When this solution has been prepared the first unit then acts as second unit, and the second unit containing the partially chlorinated solution, acts as the first unit, the chroline gas being conducted first to the second unit and then to the first unit, thus reversing the function of the units and completing the chlorination of the partially chlorinated solution of the second unit in the mixing vessel $c$ of the second unit.

For this purpose means are provided which are in connection with the chlorine mains, to enable the chlorine gas to pass first the second unit and thence through a by-pass to the first unit and from the latter to the return chlorine main (not shown).

After completion of chlorination of the liquor in the mixer, say $c$, the same is continuously stirred to prevent the suspended solids from settling and the solution of calcium chlorate and chloride is pumped whilst hot through filter-presses into a vessel provided with a stirrer and heating steam coil (not shown). In this apparatus potassium chloride in the proportion required for transforming calcium chlorate with an excess of about 2% of potassium chloride is added, the temperature being maintained at about 60–70° C., under which conditions the transformation into potassium chlorate is readily effected.

The residue is washed in the filter-press so as to extract any remaining chlorates, the washings being returned to one of the vessels $c$ of the unit in which fresh milk of lime is being prepared.

In the meantime the liquor of the mixer $c$ has been transformed into chlorates or has been partially chlorinated, according to whether the chlorination of a partially chlorinated solution was completed in the same, or a fresh solution of milk of lime was chlorinated in the same, while in the mixer $c'$ a new liquor is ready for circulation through the absorbers.

The solution containing the potassium chlorate and calcium chloride is now ready for crystallization and run into crystallizing vats for this purpose. After the bulk of the potassium chlorate has crystallized out at ordinary temperature, the mother liquor is subjected to refrigeration at $-20°$ C. or lower. Inasmuch as the mother liquor contains only 30–50 grammes, preferably 45–50 gr., $CaCl_2$ in 100 gr. of water, in accordance with the process of the inventor, only pure potassium chlorate without $CaCl_2$. Caq, or ice or of both crystallizes out.

When the invention is applied to the production of potassium chlorate, the solutions of calcium chlorate and calcium chloride can be directly prepared of 60–64° Tw., which after transformation of the chlorate of calcium into potassium chlorate and crystallization of potassium chlorate at ordinary temperatures, furnish a mother liquor containing the optimum amount of calcium chloride, i. e. 45–50 grammes $CaCl_2$ in 100 grammes of water. If the concentration in the absorption plant (after dilution) exceeds 64° Tw. the solution must subsequently after separation of potassium chlorate be diluted, so as to contain 30–50 grammes $CaCl_2$ in 100 grammes of water.

Having thus fully described my invention, what I claim as new and desire to protect by Letters Patent is:—

1. In the manufacture of chemicals by the interaction between a solution containing a solid in suspension and a gas, an apparatus adapted for the circulation therethrough of the solution containing the solid in suspension, said apparatus comprising a vessel for circulated solution, an open bottomed absorption tower dipping into said vessel and adapted to form a gas enclosing chamber with the fluid in the vessel, a mixer communicating with the tower, means for admitting gas into the tower, said tower being provided with means for spreading the circulated solution within the same to a large surface of contact between the solution and the gas, these being so arranged that the solid in suspension in the solution coming down the tower does not or cannot settle within the tower, and the vessel below the tower and the mixer being provided with stirring means preventing the solid in suspension in the solution from settling in any part of the same, which would interfere with the uninterrupted work of the process.

2. In the manufacture of chemicals by the interaction between a solution containing a solid in suspension and a gas, an apparatus adapted for the circulation therethrough of the solution containing the solid in suspension, said apparatus comprising a vessel for circulated solution, an open bottomed absorption tower dipping into said vessel and adapted to form a gas enclosing chamber with the fluid in the vessel, said tower being provided with means for spreading the circulated solution within the same to a large surface of contact between the solution and the gas, these being so arranged that the solid in suspension in the solution coming down the tower does not or cannot settle within the tower, and the vessel below the tower being provided with stirring means for preventing the solid in suspension in the solution from settling in any part of the same.

3. In the manufacture of chemicals by the interaction between a solution containing a solid in suspension and a gas, an absorbing tower provided with means for distributing the liquid circulated through said tower, said means comprising a distributor arranged near the top of the absorber, a plurality of spreading elements suspended below said distributor, said elements being capable of resisting alkali, acids and chlorine gas, and means allowing access to the lower part of the tower.

4. In the manufacture of chemicals by the interaction between a solution containing a solid in suspension and a gas, an open bottom absorbing tower provided with means for distributing the liquor circulated through said tower, comprising a distributor arranged near the top of the absorber, a plurality of spreading elements suspended below said distributor, said elements being capable of resisting alkali, acids, and chlorine gas, a vessel below the absorber adapted to contain circulating solution and into which the lower open part of the tower dips, thus enclosing the gas within the tower, said vessel below the absorber being provided with stirring means to prevent settling of the solid in suspension and the blocking up of the pipes leading the liquid away from said vessel.

5. In the manufacture of chemicals by the interaction between a solution containing a solid in suspension and a gas, an absorbing tower containing means for distributing the liquor within the absorber in form of a spray, means near the lower part of the tower to prevent settling of the solid in suspension and the blocking up of the pipes leading the liquid away from said lower part of the tower, and with means allowing access to the lower part of the tower.

6. In the manufacture of chemicals by the interaction between a solution containing a solid in suspension and a gas, an open bottom absorbing tower containing means for distributing the liquor within the absorber in form of a spray, a vessel below the absorber adapted to contain circulating solution and into which the lower open part of the tower dips, thus enclosing the gas within the tower, said vessel below the absorber being provided with stirring means to prevent settling of the solid in suspension in said vessel and the blocking up of the pipes leading the liquid away from said vessel.

7. In the manufacture of chemicals by the interaction between a solution containing a solid in suspension and a gas, an apparatus consisting of a plurality of units, each unit comprising one or more open bottom absorbing towers, an intermediate vessel and two mixers, through which the solution containing the solid in suspension is circulated passing from the top of the absorber to its bottom, the towers dipping into the intermediate vessel below the absorbers to form a liquid seal, each absorbing tower provided with means for spreading the solution within the absorber, the said spreading arrangements being so adapted that the solid in suspension in the solution does not or cannot settle within the tower, the intermediate vessel and mixers being provided with stirring means for preventing the settling of the solid in suspension in the same, means absorbing the use of one unit for completion of the reaction, such as of chlorination, while the next unit with a freshly prepared solution containing the solid in suspension, which has not or only partially been acted upon by the gas, is being used for prevention of loss of the gas taking part in the reaction.

8. In the manufacture of chemicals by the interaction between a solution containing a solid in suspension and a gas, an apparatus through which the solution containing the solid in suspension is circulated, said apparatus comprising an open bottom absorption tower in a vessel below said tower into which the tower dips, thus enclosing the gas within the absorption tower, and a mixer communicating with said vessel, said mixer and vessel below the tower being provided with stirring means, and a manhole formed in the mixer.

9. In the manufacture of chemicals by the interaction between a solution containing a solid in suspension and a gas, an open bottom absorbing tower, a vessel below said tower adapted to contain circulating solution and in which the lower open part of the tower dips, thus enclosing the gas within the absorbing tower, said vessel below the absorbing tower being provided with stirring means to prevent settling of the solid in suspension in the solution in said vessel and the blocking up of the pipes leading the liquid away from said vessel.

In testimony whereof I affix my signature.

MEYER WILDERMAN.